May 28, 1935.  F. T. POWERS  2,002,867
VIEWING CABINET
Filed Sept. 27, 1933  2 Sheets-Sheet 1

May 28, 1935.  F. T. POWERS  2,002,867
VIEWING CABINET
Filed Sept. 27, 1933  2 Sheets-Sheet 2
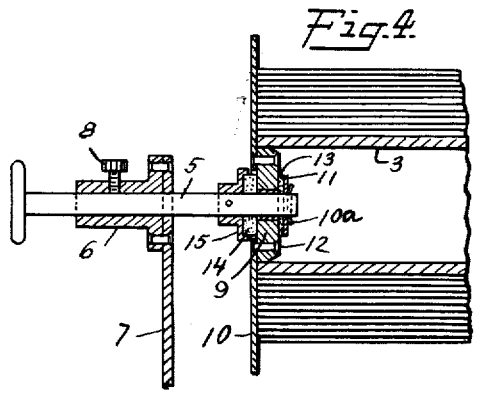
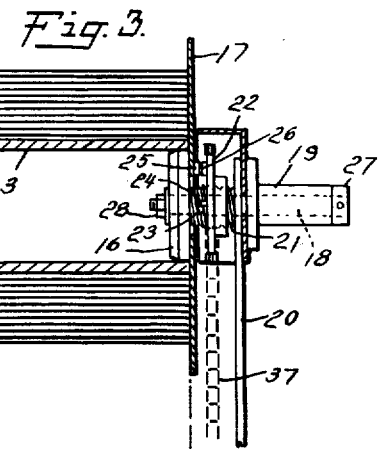
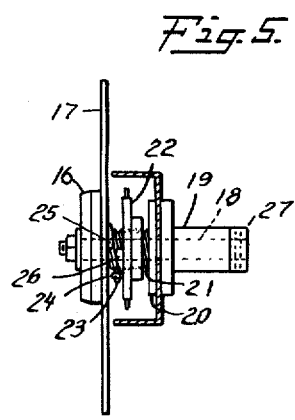
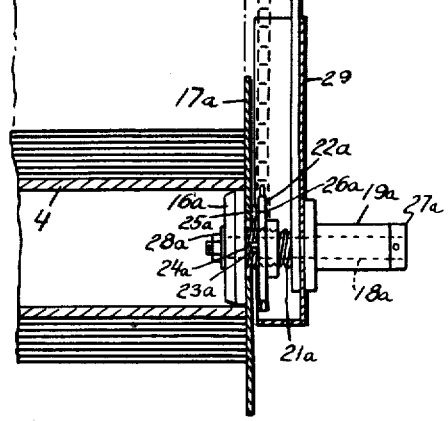
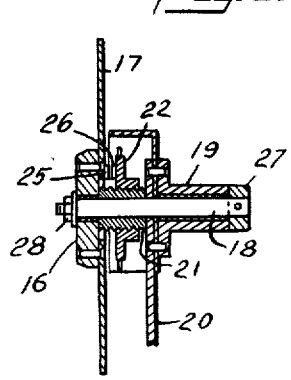

Patented May 28, 1935

2,002,867

UNITED STATES PATENT OFFICE 2,002,867

VIEWING CABINET

Frank T. Powers, Douglaston, N. Y.

Application September 27, 1933, Serial No. 691,144

9 Claims. (Cl. 40—95)

My invention relates to improvements in viewing cabinets, such as are employed in viewing images on strips of membrane, as, for example, examining radiographs of portions of the human anatomy, and has for its objects first to provide means for a very much more expeditious handling of radiographs during the process of diagnosis; second, to reduce to a minimum the manual handling of the radiographs to be examined. I attain these and other objects by the instrumentalities and mechanisms shown by way of example in the accompanying drawings.

Fig. 3 is a detail of the rotating and roll supporting mechanism.

Fig. 4 is a detail of a roll support.

Fig. 5 is a plan view, and

Fig. 6 is a vertical sectional view on the center line of Fig. 5 of a part of the rotating mechanism.

In the drawings like characters designate the same or similar parts and arrow shows direction of movement or rotation.

Figure 1:
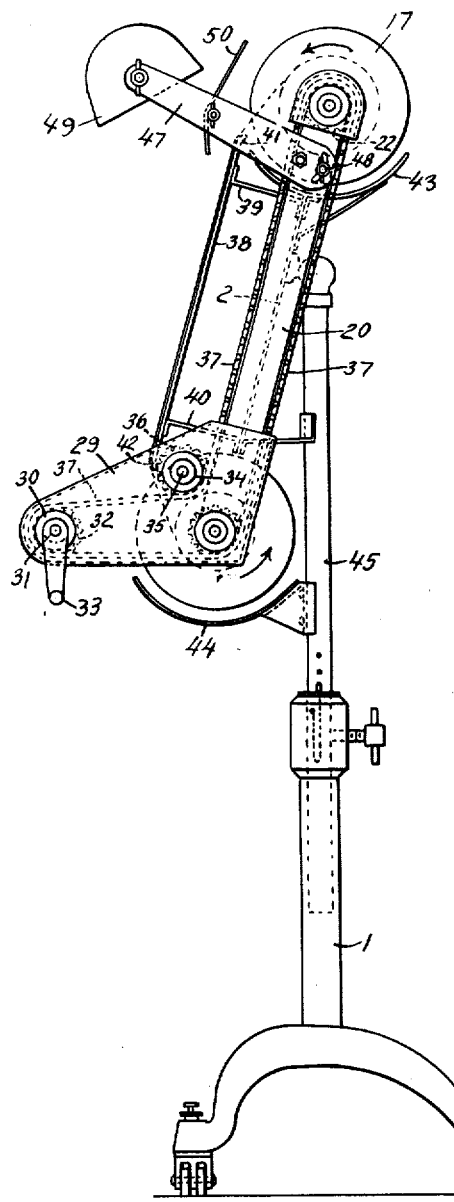
Fig. 1 is a side elevation.
Figure 2:
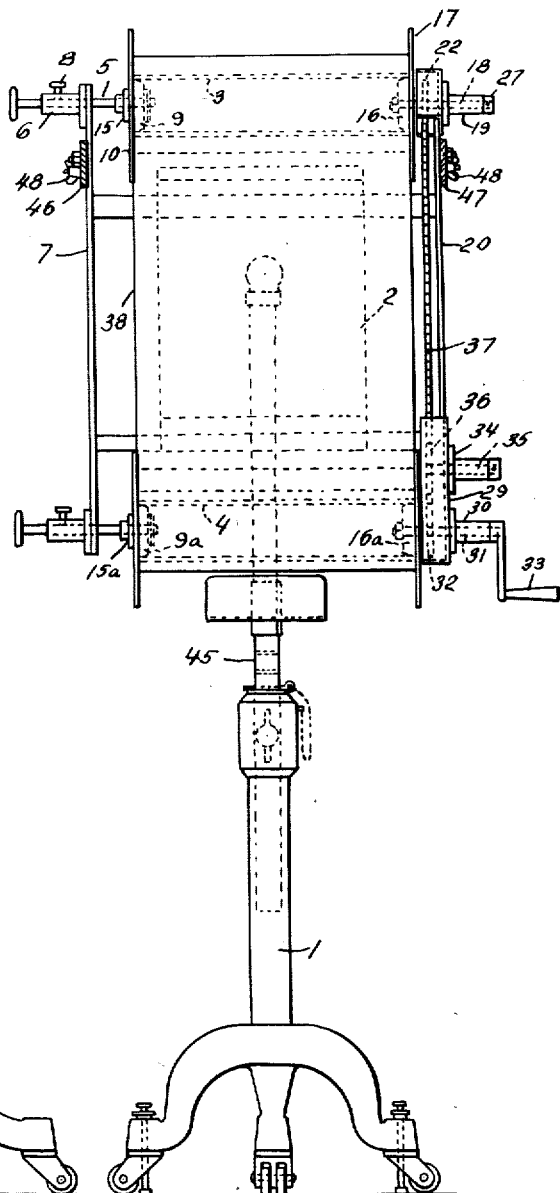
Fig. 2 is a front elevation.

Briefly, the invention provides means for mounting a roll of radiographs, which have previously been made on a continuous web or strip of ray sensitive medium, upon a rotatable holder, a second rotatable holder for the reception of a wind-up core, means intermediate the two rotatable holders for affording a suitable view of the strip of radiographs, means for transferring the strip of radiographs from one holder to the other in either direction, and means for illuminating the radiographs in the viewing position between the two holders.

Heretofore it has been customary to examine and interpret or diagnose X-ray pictures each in the form of separate sheets. This is a time consuming method since each picture must be removed from its filing envelope, separately placed by hand in the viewing cabinet under suitable conditions of illumination, and after the reading is completed the picture must be removed from the cabinet and returned to its filing envelope. By the use of my novel and useful invention a strip of a hundred or more radiographs in roll form may be placed in my new viewing cabinet and by a simple turning of a crank the pictures may be brought, one after another, into position and under conditions of illumination best suited to reading or diagnosis. The result is a very considerable reduction in the time consumed in diagnosis and also effects a marked saving in the energy and eye-strain of the examiner.

As exemplified in the drawings, a stand 1 carries a support 45 which is adjustable vertically therein and which may be secured in the desired position by means of the thumb screw and cotter pin shown. This vertical adjustment permits the device to be raised or lowered so as to place the viewing cabinet in the proper position for visual examination and diagnosis of the radiographs. On the support 45 is mounted a frame 2 carrying at its upper and lower extremities pairs of adjustable and rotatable holders for tubular spools or cores 3 and 4. These cores may be of a variety of materials, such as metal, cardboard, composition or other suitable material. I prefer to make these cores of carboard and in this description and in the drawings I have indicated them as being of cardboard, but I may also use cores of other materials. The upper and lower core holders are similar in construction and one only is described herein. They consist of a slidable and rotatable assembly on one side of the cabinet, and a non-slidable but rotatable assembly on the other side.

The slidable upper holder as shown in detail in Fig. 4 consists of the shaft 5 slidable in bearing 6 mounted on the side of the frame 7 and held in place with set screw 8. On the inner end of shaft 5 is rotatably mounted a cone shaped hub 9 of a diameter such that it fits snugly into the cardboard cores. The shaft 5 is of such a length that its extent of axial adjustment is sufficient to permit rolls of different widths to be accommodated in the roll holders. The hub 9 is attached by rivets 12 to disc 10, which has a diameter at least equal to that of the largest roll of pictures to be examined. The hub 9 and its attached disc 10 are rotatably mounted on shaft 5, and are held in position by means of cotter pin 10a and washers 11 and 13, one of which, 13, I prefer to make of fibre. On the opposite side of the hub 9 I provide a friction brake in the form of a felt washer 14 between disc 10 and the recessed collar 15. On the opposite side of the frame,—see Figs. 3, 5 and 6,—I provide a second hub 16, with a disc 17 attached to it and both rotatably mounted on shaft 18 operating in bearing 19 and restrained against longitudinal motion by the collar 27 on one end and the nut 28 on the other end. On shaft 18, between disc 17 and the frame 20, is a sleeve 21, having a right hand coarse screw thread on its outer surface. Mounted on this sleeve is a sprocket 22 having an internal thread fitting the thread on sleeve 21. Fixed in collar 21 is a pin 23, and fixed in the sprocket 22 is a pin 24. On the face of disc 17 is fixed a stop 25, and on the face of sprocket 22 is attached a similar stop 26.

The lower pair of core holders, one of which is shown in Fig. 3, are similar to the upper pair just described, except that the screw thread on the sleeve 21a is cut left hand instead of right hand. Its corresponding parts are indicated by corresponding numerals with the suffix *a* added to each.

A bracket 29 attached to one of the side members of the frame 2 carries a bearing 30 in which is a shaft 31 on the inner end of which is sprocket 32, and on the outer end is crank handle 33. The bracket 29 also carries bearing 34 in which is shaft 35 which carries sprocket 36. The chain 37 connects sprockets 22, 22a, 32 and 36. Bracketed out from the frame 2 is a flat rectangular plate 38, supported by brackets 39 and 40, having its top and bottom edges, 41 and 42, slightly curved. When illumination is desired from the front of the strip supporting plate 38, it may be made of opaque material, such as metal, fibre, composition, etc., and when illumination is desired from the rear, the plate may be made of transparent or translucent material, such as ground glass, for example, supported only at the edges, and illuminated from the back by transmitted light.

Under the upper pair of core holders, I provide a curved shelf 43, bracketed from frame 2 and under the lower pair of core holders I provide a curved shelf 44, bracketed from the support 45. The brackets 46 and 47 are pivotally attached to frame member 7 and may be swung through an arc and clamped in the desired position by the thumb nut 48 on stand in curved slot. These brackets carry a pivoted reflector 49, within which is a lamp, not shown. The same brackets, 46 and 47, also support a pivoted shield plate 50 which may be tilted in the desired position to intercept light from the lamp which would otherwise cause glare in the eyes of the observer.

It is to be understood that I may replace the hand crank method of driving by a motor or other form of mechanical power, or I may provide separate cranks or other driving means for each of the rotatable holders, and may make numerous other modifications of the design of my machine without departing from the spirit of my invention.

The method of operation of my machine is as follows. The roll of radiographs to be examined is first wound on a core of cardboard or other material which fits tightly over the taper hubs 9 and 16. After loosening the set screw 8, the shaft 5 is drawn out until the collar 15 is against the side of frame 7, thus providing space between hubs 9 and 16 for the insertion of the roll. During this operation the roll may be supported by the curved shelf 43. The cardboard core in the roll is placed over cones 9 and 16 and the shaft 5 is pushed firmly in until flanges 10 and 17 are against the ends of the roll. The set screw 8 is then tightened, thus holding the shaft 5 in place. A cardboard core 4 is placed by similar procedure on the lower pair of hubs 9a and 16a. The loose end of the roll of radiographs is drawn down over the front of plate 38, and attached to cardboard core 4 on the lower pair of holders and attached thereto by any convenient means, such as by a strip of adhesive tape or by inserting the end of the roll in a slot in the core. The roll is now ready for examination.

Upon turning the crank 33 the chain 37 rotates sprockets 22 and 22a. As sprocket 22a is rotated in the direction of the arrow or such that the upper side of the sprocket moves toward the observer, the sprocket turns on threaded sleeve 21a and travels to the left until stop 26a on sprocket engages stop 25a on disc 17a, thus rotating the core 4 and winding the strip of radiographs thereon, and drawing them over the plate 38. Simultaneously the rotation of sprocket 22 on the threaded sleeve 21 causes it to travel to the right to a position in which stop 26 on sprocket 22 is out of engagement with stop 25 on disc 17 and pin 24 contacts with pin 23 and disc 17 with its cone and the roll of radiographs is free to rotate but is slightly retarded by the friction brake 14, thus keeping a constant slight tension on the roll of radiographs, and also overcoming the tendency of the roll to continue to revolve by its own momentum when the operator ceases to turn the crank 33. Upon reversal of the movement of the crank 33 sprocket 32 travels along threaded sleeve 21 bringing stop 26 into engagement with stop 25, and driving the upper roll while the lower roll is free to turn without restraint. Thus the operator, by turning crank in one direction or the other, may move the strip of radiographs either upward or downward at will, and the drive is automatically transferred from one sprocket to the other and automatically disengaging the sprocket which is not driven.

The necessity for this lies in the fact that the diameters of the upper and lower rolls is always different except when one half of the strip of radiographs is on one roll and one half is on the other roll. At all other times the two rolls move at different revolutions per minute, and if driven by rigid drives at the same rate would either tend to tighten or to loosen the strip between them.

As the strip of membrane on which the radiographs are taken is drawn over the supporting plate 38, it is in a position suitable for reading. That is, the angle of this plate with the vertical is such as to position that section of the membrane which is supported thereon in a plane which has been predetermined to be ideal for convenient reading.

In this description I have described the upper pair of holders as receiving and supporting the roll of strip membrane and the lower pair of holders or means for receiving and rolling up the strip membrane as the one to which the strip is transferred in the operation of viewing the pictures thereon. When a roll has been so transferred from the upper support to the lower support, it is not necessary to rewind the roll previous to a subsequent viewing thereof.

For this reason, in the appended claims I make no distinction between the two pairs of supports. They may be used alternately as means for rotatively supporting the roll, or as means for receiving and rolling up the strip membrane.

I intend the above description and the accompanying drawings to be illustrative and descriptive but not restrictive of my invention, as many variations thereof and departures therefrom may be made without departing from the spirit and scope of my invention.

Having fully described my invention and the means of its use, I now state what I claim to be new and for which I pray that Letters Patent be granted.

I claim:

1. In a machine for viewing a strip of images, the combination of a holder for a roll of said strip, a holder for a receiving core for said strip, said holders having opposed rotatable hubs adapted to engage the ends of said roll and of said receiving core, a plate intermediate of said holders, and means including one of the rotatable hubs of each of said holders for selectively rotating either said receiving core or said roll to feed the strips in either direction over the surface of said plate.

2. In a machine for viewing a strip of images, the combination of separate holders for a roll of the strip and for a receiving core for said strip, each of said holders having opposed rotatable cones with flanges attached thereto, adapted to engage the ends of said roll and said core, respectively, and means operable from a single source for selectively rotating either of said holders, including a driving sprocket, a driven sprocket on each of said holders, a single chain co-operating with said sprockets, internally threaded openings in each of said driven sprockets, externally threaded collars within said openings, stops on one face of each of said driven sprockets, adapted to engage stops on flanges of said holders, stops on each of said driven sprockets adapted to engage stops on each of said collars.

3. A machine of the character described for handling a strip wound on a hollow core comprising a pair of opposed rotatable hub members adapted to project into the opposite ends of a core and frictionally engage the same, one of said hub members being axially movable for mounting of the core, and means engaging the other of said hub members operative to turn the hollow core in a direction to wind the strip thereon.

4. A machine of the character described for handling a strip wound on a hollow core comprising a pair of opposed rotatable hub members adapted to engage the ends of said core, a second core on which the strip is to be wound from the first-mentioned core, a second pair of opposed rotatable hub members adapted to project into and frictionally engage the ends of said second core, a shaft member on which one of said last-mentioned hub members is journaled, said last-mentioned hub member being axially adjustable with reference to the other hub member of the pair, means for securing the same in its desired axial position and means engaging one of the last-mentioned hub members for turning the second core to wind the strip thereon.

5. A machine of the character described for handling a strip wound on a hollow core comprising a pair of opposed rotatable hub members adapted to engage the ends of said core, a second core on which the strip is to be wound from the first-mentioned core, a second pair of opposed rotatable hub members adapted to project into and frictionally engage the ends of said second core, a shaft member on which one of said last-mentioned hub members is journaled, said last-mentioned hub member being axially adjustable with reference to the other hub member of the pair, means for securing the same in its desired axial position and means engaging one of the hub members of each pair alternately for winding the strip onto or off from the second core as desired.

6. In an exhibiting device for a strip of radiographs or other records, a hollow core on which the strip may be wound, a pair of rotatable hub members frictionally engaging the ends of said core, a disc-shaped flange on one of said hub members and means engaging said flange to turn the hollow core through frictional engagement of the flanged hub member therewith.

7. In a device for selectively exhibiting for examination each image on a strip of radiographs, the combination comprising a stand of adjustable height, a frame carried on the upper portion of said stand, a rotatable holder for a roll of said strip of radiographs, said holder being journaled in said frame, a second rotatable holder journaled in said frame for receiving and winding said strip of radiographs, a plate carried by said frame and positioned between said strip holders, and crank operated means for rotating one of said holders for drawing said strip across said plate to said holder, said crank being journaled in said frame at a point in front of the plane of said plate.

8. In a device for selectively exhibiting each image on a roll of radiographs, the combination comprising an adjustable height frame, a holder for said roll of radiographs, said holder being journaled in said frame and having rotatable hubs, a second holder also journaled in said frame and having rotatable hubs, a core carried in said second holder and adapted to have said roll of radiographs wound thereon, a plate supported by said frame between said holders, said plate being arranged at a convenient reading angle, means for rotating said core for drawing said radiographs from the roll across said plate for winding on said core, and adjustable illuminating means positioned over said plate for lighting the radiographs being exhibited.

9. In a device for selectively exhibiting for examination each image on a strip of radiographs, the combination comprising, a stand of adjustable height, a frame supported by said stand, a plate carried on said frame, a rotatable holder for a roll of said strip of radiographs said holder being journaled in said frame at one side of said plate, a second rotatable holder journaled in said frame at the opposite side of said plate, both of said holders being adjustable for receiving rolls of varying widths, and a curved shelf for each of said holders, said shelves being carried by said frame adjacent to said holders.

FRANK T. POWERS.